Figure 1:
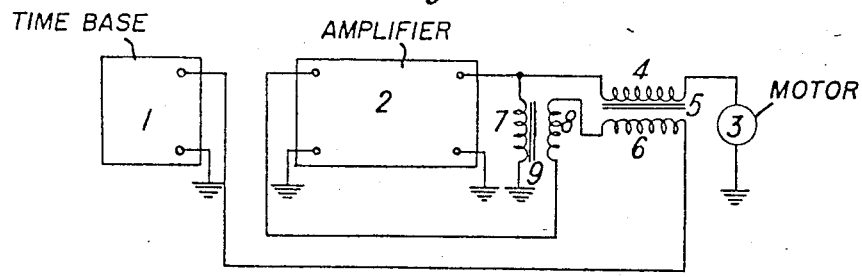

Dec. 8, 1959 F. P. MASON ET AL 2,916,682

POWER SUPPLY EQUIPMENT

Filed Oct. 25, 1956

Inventor
F.P.MASON-G.J.L.STEVENS
By *R P Morris*
Attorney

United States Patent Office 2,916,682
Patented Dec. 8, 1959

2,916,682

POWER SUPPLY EQUIPMENT

Frederick Percival Mason and Graham John Lloyd Stevens, Croydon, England, assignors to Creed & Company Limited, Croydon, England, a British company Application October 25, 1956, Serial No. 618,215

Claims priority, application Great Britain November 22, 1955

3 Claims. (Cl. 318—171)

This invention relates to alternating current power supply equipment for the supply and control of power to synchronous electric motors.

Sources of power for driving synchronous electric motors used in certain equipment where precisely known and precisely maintained speeds are important, such as telegraph facsimile equipment, recorders, transceivers and the like, need to be of a high order of frequency precision. For this purpose, they comprise a time base, such as, for example, a self-maintained tuning fork, and an amplifier which accepts a small signal from the time-base and delivers a suitably high power for driving the motor of the equipment or machine in question.

A major part of the size, weight and cost of the equipment is contributed by the amplifier portion, and these factors are in turn almost directly proportional to the maximum power output the amplifier is designed to deliver. This, in turn, must clearly be the maximum power demanded by the motor, which, in general, is the starting power.

If, however, an amplifier is designed so that its maximum output is available for starting purposes, it is found that, as the motor increases in speed and consequently demands less power, the voltage applied to the motor by the source increases prohibitively, causing the motor to overheat.

One method of reducing this effect is to use a larger capacity amplifier so that the change in power demanded by the motor represents a smaller fraction of the maximum output of the amplifier. This course, however, is not readily acceptable on account of the accompanying increase in size, weight and cost.

It is an object of this invention to provide means in a power supply equipment of the type described above to prevent the unwanted increase in the voltage applied to a synchronous motor as its speed increases, even though an amplifier be used of which the maximum output is only just sufficient for starting purposes.

According to the invention, therefore, there is provided alternating current power supply equipment for driving a synchronous electric motor, which comprises a source of stable frequency and an amplifier, and variable gain means in the said amplifier responsive both to motor current and amplifier output voltage for causing the gain of the amplifier to be a maximum when the load current demanded is greatest.

According to a subsidiary feature of the invention, the variable gain means may comprise means for applying negative feedback voltage to the amplifier proportional to the output voltage of the amplifier, and means for applying positive feedback voltage to the amplifier proportional to the current demanded by the motor, the sum of the said feedback voltages being substantially zero when the motor is stationary.

The amplifier may be arranged so that, when the motor is at stand-still, the negative feedback applied is zero or nearly so. When the motor speed increases, the negative feedback is increased by such an amount for every value of speed that the output voltage is maintained constant, or nearly so.

This may be achieved by deriving the feedback potential from a series combination of negative feedback potential proportional to the output voltage of the amplifier and a positive feedback potential proportional to the current demanded by the motor.

The values of the negative and positive feedback are arranged to be almost equal when the motor is at standstill. In practice, to prevent instability, the negative feedback is arranged to be slightly greater than the positive feedback.

Then, as the motor accelerates and demands less current, the positive feedback diminishes, as and on account of the regulation of the power source and the consequent increase of output voltage, the negative feedback increases. Thus the combined effect of the series-connected feedback potentials is the application of a negative feedback which, while being substantially zero when the motor is at standstill, increases as the motor speed rises.

It is clear that, by suitable choice of the magnitudes of the feedback potentials, the output voltage may be maintained substantially constant at all motor speeds.

The invention will be particularly described with reference to the accompanying drawing illustrating, in Fig. 1, a preferred embodiment, and in Fig. 2, a modification.

In Fig. 1 of the drawing, a time-base 1 provides an input to amplifier 2, whose output drives the motor 3 of, e.g., a facsimile machine. The current from the amplifier 2 to the motor 3 traverses winding 4 of series transformer 5. Winding 6 of this transformer is connected in series with the path from time-base 1 to amplifier 2. The potential induced in winding 6 is arranged to augment the output of time-base 1. The amplifier output potential is applied to winding 7 of shunt transformer 8, whose secondary winding 9 is also connected in series with the path from time-base 1 to amplifier 2. The potential induced in winding 9 opposes the output of time-base 1.

When the motor is at standstill, the induced voltages in windings 6 and 9 are mutually annulling, so that the input to amplifier 2 is the output of time-base 1. As the motor gains speed, the induced voltage in winding 9 increases, while that in winding 6 decreases. The combined effect of these two voltages is to oppose the output of time-base 1 and thus to diminish the input to amplifier 2.

By proportioning suitably the induced voltages of windings 6 and 9, it is evident that for all current demands made by motor 3 the net input to amplifier 2 can be controlled in such a way that the output voltage of amplifier 2 is substantially constant.

Figure 2:
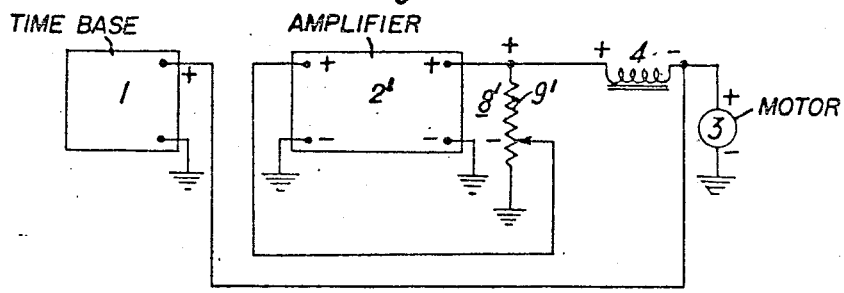

It will also be evident that the shunt transformer 8 may be replaced by a potentiometer 8 across the amplifier output terminals for deriving a suitable proportion 9 from the amplifier output for negative feedback, while the series transformer 5 may equally be replaced by an impedance 4 in series with the motor-amplifier connection (carrying the motor current) for deriving the positive feed-back, the arrangement being as shown in Fig. 2, where the plus and minus signs represent instantaneous polarities to demonstrate the two sorts of feed-back developed.

The amplifier in either embodiment may be of any known type, e.g. thermionic, magnetic.

While the principles of the invention have been described above the connection with specific embodiments, and particular modifications thereof, it is to be clearly understood that this description is made only by way of

What we claim is:

1. An alternating current power supply equipment for driving a synchronous motor comprising: a source of alternating current energy of stable frequency, an amplifier having input and output circuits, means connecting said input circuit to said energy source and means connecting said output circuit to said motor and means for maintaining the output voltage of said amplifier substantially constant, said last named means comprising a first device connected in said output circuit and responsive to the current flowing therein for causing a positive feedback voltage to be fed back to said input circuit and a second device connected across said output circuit and responsive to the voltage developed thereacross for causing a negative feedback voltage to be fed back to said input circuit.

2. An alternating power supply equipment in accordance with claim 1, wherein the means for maintaining the output voltage of said amplifier substantially constant comprises adjustment means connected in operative relationship to at least one of said devices to adjust the relative values of negative to positive feedback voltages to produce a value of negative feedback voltage which is slightly greater than the value of said positive feedback voltage.

3. An alternating power supply equipment in accordance with claim 2 in which said adjustment means is connected to said second device.

References Cited in the file of this patent

UNITED STATES PATENTS 2,636,149   Graham _____ Apr. 21, 1953